(12) United States Patent
Yanagisawa et al.

(10) Patent No.: US 6,239,792 B1
(45) Date of Patent: *May 29, 2001

(54) COORDINATE INPUT SYSTEM HAVING MULTIPLE EDITING MODES

(75) Inventors: Ryozo Yanagisawa, Chiba-ken; Atsushi Tanaka, Yamato; Yuichiro Yoshimura, Kamakura; Katsuyuki Kobayashi, Yokohama; Masaki Tokioka, Fujisawa; Hajime Sato, Yokohama, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/657,552

(22) Filed: Jun. 4, 1996

(30) Foreign Application Priority Data

Jun. 7, 1995 (JP) ...................................................... 7-164758

(51) Int. Cl.$^7$ ...................................................... G09G 5/00
(52) U.S. Cl. ............................................. 345/179; 345/159
(58) Field of Search ..................................... 345/173, 179, 345/180, 182, 183, 157, 159, 145; 178/18, 19

(56) References Cited

U.S. PATENT DOCUMENTS

| | | | | |
|---|---|---|---|---|
| 4,317,956 | * | 3/1982 | Torok et al. | 345/157 |
| 4,633,436 | * | 12/1986 | Flurry | 345/179 |
| 4,764,885 | * | 8/1988 | Greanias | 345/173 |
| 5,299,307 | * | 3/1994 | Young | 345/163 |
| 5,325,110 | * | 6/1994 | Tang et al. | 345/145 |
| 5,406,307 | * | 4/1995 | Hirayama et al. | 345/179 |
| 5,469,191 | * | 11/1995 | Smith, III et al. | 345/159 |

FOREIGN PATENT DOCUMENTS

| | | | |
|---|---|---|---|
| 63-113720 | | 5/1988 | (JP) . |
| 0144595 | * | 6/1990 | (JP) ...................... 345/145 |
| 341572 | | 2/1991 | (JP) . |
| 3171321 | | 7/1991 | (JP) . |

* cited by examiner

*Primary Examiner*—Chanh Nguyen
(74) *Attorney, Agent, or Firm*—Fitzpatrick, Cella, Harper & Scinto

(57) ABSTRACT

An object of the invention is to allow an editing work such as image input and image erasure to be performed easily. Specifically, according to the invention, a size of an image editing area is changed with a motion amount of input coordinates. Therefore, the size suitable for each type of editing process can be set without specific operation instructions, and the editing area having a suitable area size can be designated without interrupting a trace input operation.

14 Claims, 3 Drawing Sheets

COORDINATE INPUT SYSTEM HAVING MULTIPLE EDITING MODES

BACKGROUND OF THE INVENTION

1 Field of the Invention

The present invention relates to an information processing apparatus and method in which an input point or a trace of consecutive input points of a coordinate pointer is displayed or erased by moving the coordinate pointer on the surface of an input plate.

2 Related Background Art

A conventional information processing apparatus of the type that an input point or a trace of consecutive input points of a coordinate pointer is displayed or erased by moving the coordinate pointer on the surface of an input plate, is mainly constituted by a pen or mouse as the coordinate pointer, a liquid crystal display (LCD) or the like as a display unit integrally formed with the input plate on the surface of which the coordinate pointer is moved, and various controllers and drivers.

For example, as coordinate input systems having a coordinate pointer and an input screen, there are a resistor film system (pressure sensitive system), an ultrasonic wave using system, an electrostatic capacitance coupling system, an electromagnetic induction system, and the like.

With the information processing apparatus constructed as above, when an operator moves a coordinate pointer such as a pen near to the input screen, or touches the input screen with the coordinate pointer, the input point of the pen is detected by a controller, and in accordance with an output from the controller, a control means executes a predetermined function, e.g., a menu command execution. An input point of the pen is displayed by a driver circuit on the input screen, or a group of consecutive input points detected by a predetermined sampling is interconnected by a line to form the trace of the pen on the input screen. In addition, through recognition of this trace, characters or figures can be recognized, a gesture command can be executed, or other operations can be performed.

Input information of a pen for selecting an erasure mode of a menu command or an icon displayed on the input plate is also used as erasure information for instructing to erase (or temporarily erase) an already displayed point or line. In this case, the control means sets a predetermined size of a circle or rectangle area to be erased by one input point. A plurality of erasure area sizes are sometimes arranged to be set. Or in some cases, a point, line, or area is designated and erased by selecting an erasure command.

Such an information processing apparatus has various sizes ranging from a small portable size allowing a user to carry the apparatus in a suitcase or the like to a large size of a so-called electronic blackboard size. Since such an information processing apparatus can be used with a pen, like writing on a paper sheet, it provides easy-to-use man-machine interface.

However, with a conventional information processing apparatus, it is necessary for a user to rub the erasure area (points, lines, characters or figures made of points and lines) several times with a coordinate pointer such as a pen, if input information of the coordinate pointer is used as erasure information.

For example, if the erasure area set to one input point is small, the user is forced to rub the erasure area several times for a long time period with a pen or the like.

If a plurality of erasure area sizes for one input point are prepared, a suitable size is selected as large as possible. However, it is difficult to select a suitable erasure area size because of a difference between the erasure area size and the size of a coordinate pointer (e.g., a pen having a needle-like tip considerably smaller than an erasure area of points or lines). Therefore, when touching the erasure area with a pen, other points or lines to be left unerased may be erased inadvertently.

There is another erasure method in which an erasure area is surrounded by a trace of consecutive input points of a coordinate pointer or a rectangular erasure area is set by a diagonal line interconnecting two input points. With this method, a user first selects an erasure input mode, then designates an erasure area, and erases the area after confirming the erasure area designation. The user is therefore required to perform complicated operations.

Another method (e.g., Japanese Patent Application Laid-open Nos. 63-113720, 3-41572, and 3-171321) in which a width of a line is changed with a detected force of a pen as a coordinate pointer pressed against the input plate, may be applied for using pen input information as the erasure information. With this method, the erasure area size per one input point is changed with a pen pressure. With this method, however, a user is required to have high skill in order to grasp the relationship between a pen pressure and an erasure area size.

An erasure operation is generally performed to erase unnecessary information. It is very inconvenient if the erasure operation requires long time, much labor, high skill, and complicated processes, and the features such as easy-to-use man-machine interface specific to the information processing apparatus are considerably degraded.

SUMMARY OF THE INVENTION

According to the present invention, control means controls to change an image processing area size with a motion of a coordinate pointer so that a user is not requested for long time, much labor, high skill, and complicated processes, and can simply and reliably erase or draw only information to be erased or drawn without inadvertently erasing points or lines to be left unerased. It is therefore possible to realize an information processing method and apparatus having easy-to-use man-machine interface.

According to the present invention, the control means controls to change an image processing area size with a motion distance of a coordinate pointer so that a user can simply and reliably erase or draw only information to be erased or drawn.

According to the present invention, the control means controls to change an image processing area size with a motion speed of a coordinate pointer, a larger erasure size when the motion of the coordinate pointer is fast and a smaller erasure size when the motion of the coordinate pointer is slow, so that a user can simply and reliably erase only information to be erased.

According to the present invention, the control means controls to change a drawing area size with a motion speed of a coordinate pointer, a larger pen drawing size when the motion of the coordinate pointer is fast and a smaller drawing size when the motion of the coordinate pointer is slow, so that a user can instruct to change the drawing area size without interrupting the drawing operation and the handling performance can be improved.

According to the present invention, even with the same motion of a pen, a method of changing an image processing area size is made different in correspondence with a selected mode. Accordingly, an apparatus having a good handling performance suitable for each selected mode can be realized.

DETAILED DESCRIPTION OF THE PREFERRED EMBODIMENTS

Embodiments of the present invention will be described with reference to the accompanying drawings.

Figure 1:
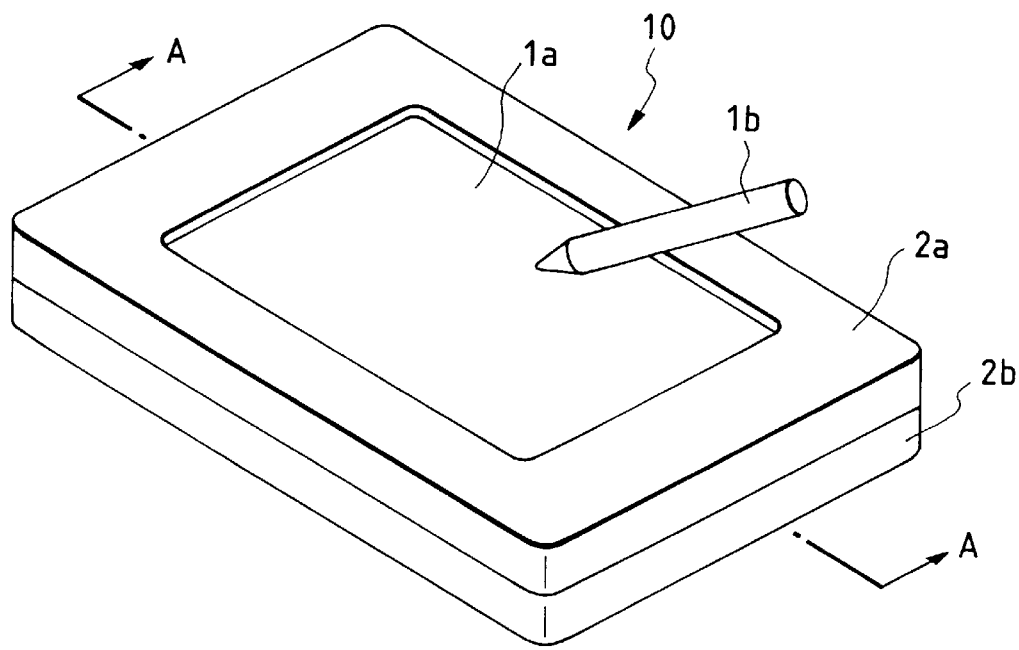
FIG. 1 is a perspective view of an information processing apparatus according to an embodiment of the invention.
Figure 2:
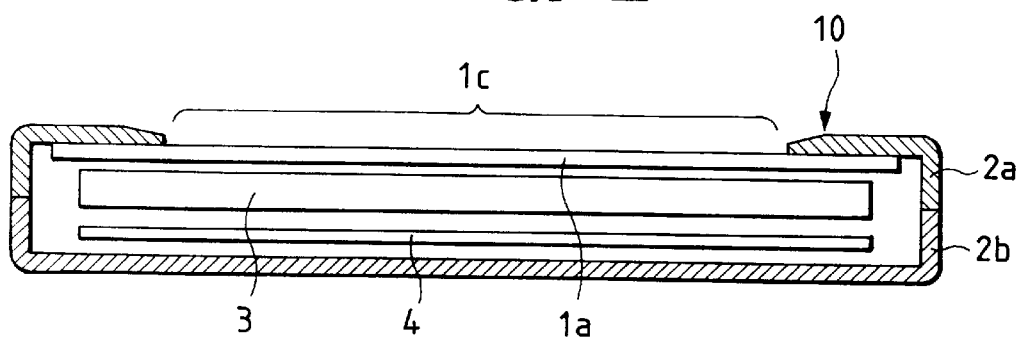
FIG. 2 is a cross sectional view of the information processing apparatus of the embodiment shown in FIG. 1.

FIG. 1 is a perspective view showing the outline of an information processing apparatus according to a first embodiment of the invention, and FIG. 2 is a cross sectional view taken along line A—A in FIG. 1.

Main constituent elements of this apparatus are a main body 10 having generally a solid outer appearance and a pen 1b. The pen 1b is used as a coordinate pointer for pointing a coordinate point on an input surface 1c provided on the main body 10.

The main body 10 is constituted by an input plate 1a generally rectangular in shape having the input surface 1c, a liquid crystal display (LCD) 3 integrally formed with, and superposed upon, the input plate 1a, an upper frame 2a having an opening at the input surface of the input plate 1a, a lower frame 2b, and a printed circuit board 4 disposed under LCD 3.

A predetermined gap is formed between LCD 3 and the input plate 1a so that LCD 3 and the input plate 1a do not contact each other when the pen 1b touches the input surface.

The printed circuit board 4 has as many layers as necessary and various interconnections and circuit elements to be described later, including a CPU 5, a memory 6, an LCD driver, a controller 8, an unrepresented inverter, DC—DC converter, and various connectors.

A coordinate input system for this apparatus having the input plate 1a and pen 1b is a so-called resistor film or pressure sensitive system. The input plate 1a is constituted by a laminate of base plates made of glass or resin and resin films each stacked upon a corresponding base plate with a predetermined gap. A resistor film is provided between a pair of confronting base film and resin film.

Figure 3:
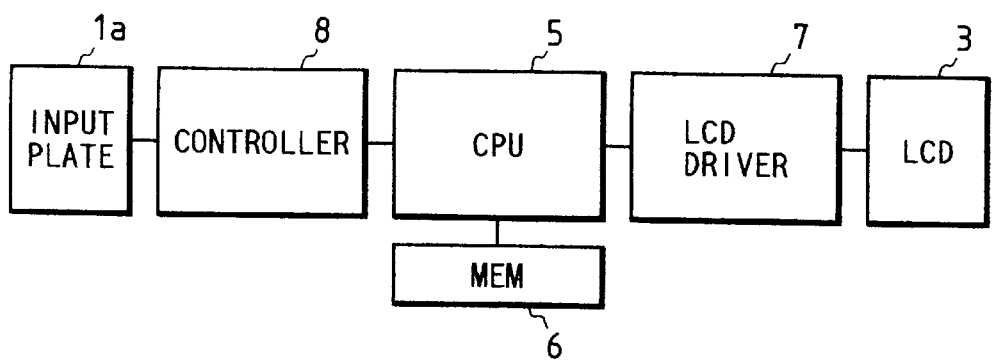
FIG. 3 is a circuit block diagram of the information processing apparatus of the embodiment.

FIG. 3 is a block diagram showing the control system of the main body 10.

As shown in FIG. 3, the control system of this apparatus mainly includes the input plate 1a, controller 8, LCD 3, LCD driver 7, CPU 5, and a memory 6 for storing various programs and information on the display screen.

The controller 8 controls to provide a voltage or current across or through each resistor film formed in the input plate 1a, to measure a ratio or the like of the voltage or current at the input point pressed with the pen 1b to detect the coordinates of the input point, and to output it to CPU 5.

CPU 5 operates to display menu commands or icons on the screen of LCD 3 at predetermined positions, and when a user selectively designates a menu command or icon, it executes the corresponding command, e.g., sets each mode such as an erasure mode. In accordance with an output from the controller 8, CPU 5 operates to display an input point in real time on LCD 3 with the help of the LCD driver, or if a consecutive input with the pen 1b is carried out, it operates to display a trace of consecutive input points detected at a predetermined sampling rate and interconnected by a line. CPU 5 recognizes a trace to perform character or figure recognition or execution of a gesture command or the like. In this manner, a compact information processing apparatus is realized which can input/output various types of information with only the pen 1b without using a keyboard.

If a user selects the erasure mode, CPU 5 converts input information from the pen 1b into erasure information to be used for erasing points, lines, or characters or images made of points and lines respectively displayed on LCD 3, sets an erasure area, and changes the erasure area while detecting a motion speed of the pen 1b. In this manner, CPU 5 controls to erase the information in the erasure area as if the pen 1b operates like an eraser. CPU 5 also controls to erase information in the area along the trace of the pen 1b by coupling erasure areas corresponding to consecutive input points.

The erasure area has a predetermined size per one input point of the pen 1b, for example, it is a circle area having a predetermined radius whose center is the input point. The shape of the erasure area is not limited to a circle, but various shapes may be used such as a square, ellipsoid, rhombus, and the like.

In erasing information in the area along the trace of the pen 1b by coupling erasure areas corresponding to consecutive input points, one erasure area, for example, a circle erasure area, and the next circle erasure area are coupled by tangent lines or the like to define an erasure area of the trace.

The erasure area size is changed with the motion speed of the pen 1b. This motion speed is calculated by CPU 5 by using coordinate data of an input point detected by the controller at a predetermined sampling rate. Specifically, a motion distance is obtained from the presently detected coordinate data and the coordinate data at an input point one sampling point before, and this motion distance is divided by a sampling time which is an inverse of the sampling rate to obtain the motion speed.

If this sampling rate is set to about 100 points/sec, a user can change the erasure area size generally in real time and does not confuse in using the apparatus.

Figure 4:
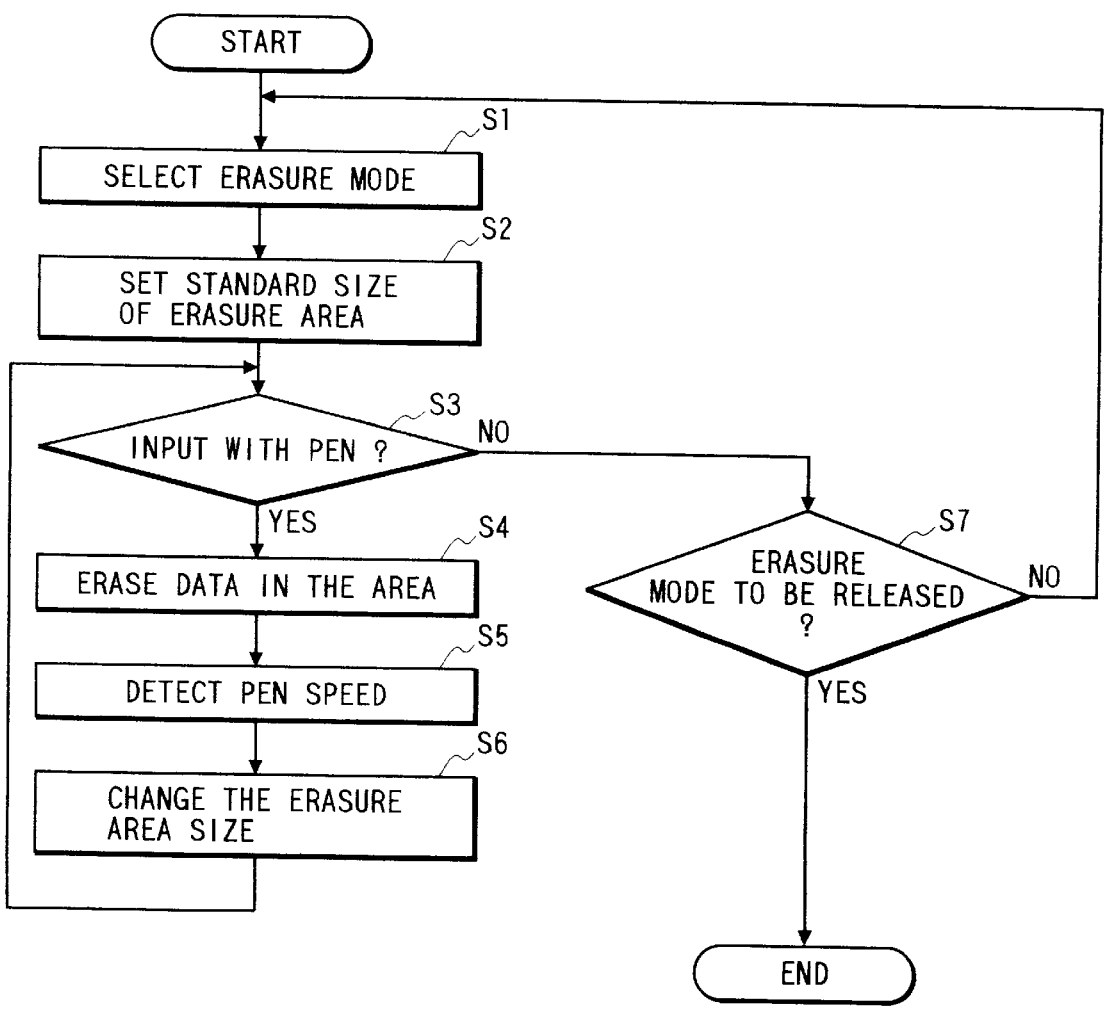
FIG. 4 is a flow chart illustrating the operation of an erasure process.

Next, the operation of the embodiment constructed as above, mainly the process of erasing information displayed on LCD 3, will be described with reference to the flow chart shown in FIG. 4.

As a user starts up this apparatus, CPU 5 displays menu commands or icons on the screen of LCD 3 and the apparatus enters an input wait state.

If the user selects the erasure mode by pointing a corresponding menu command or icon with the pen 1b, CPU 5 sets the erasure mode in which input information from the input pen 1b is converted into erasure information to be used for erasing points, lines, or characters or images made of points and lines respectively displayed on the screen (Step S1).

After the erasure mode is set, CPU 5 sets an erasure area having a predetermined size relative to one input point of the pen 1b (Step S2).

Next, CPU 5 checks whether or not any input is entered by the user with the pen 1b (Step S3). If not, CPU checks if the user instructed to release the erasure mode by using an icon or the like (Step S7). If instructed, the erasure mode is released. Whereas, if there is an input, information of point, line or the like in the erasure area corresponding to this input point is erased (Step S4). In this case, the erased information may be erased (deleted) from the memory 6 or may be maintained stored in the memory 6 although it is erased from the screen.

CPU 5 detects the motion speed of the pen 1b in accordance with the input point at Step S3 and the next input point (Step S5). In accordance with this motion speed, the size of the erasure area for an input point, e.g., a radius of a circle, a length of a side of a square, or the like, is changed and set (Step S6) to erase the information of points, lines, or the like in the erasure area having the side changed in correspondence with the next input point (Step S3).

If the pen 1b detaches once from the input plate 1a at Step S3 and the erasure mode is not instructed to be released (Step S7), then the size of the erasure area is again set to the predetermined standard size (Step S2). Therefore, if this standard size is set small, information to be left unerased at the reentered input point of the pen 1b is prevented from being inadvertently erased.

According to this embodiment, CPU 5 sets the erasure area size larger if the motion speed of the pen 1b is fast, and sets it smaller if the motion speed of the pen 1b is slow. Therefore, a user can select a small erasure area if the user moves the pen 1b slowly, or selects a large erasure area if the user moves the pen 1b fast. Fine and narrow pattern information can be easily erased without erasing the information to be left, by moving the pen 1b slowly, whereas information in a broad area can be erased easily by moving the pen 1b coarsely and quickly. It is therefore possible to realize an information processing apparatus having easy-to-use man-machine interface in which a user is not requested for long time, much labor, high skill, and complicated processes, and can simply and reliably erase only information to be erased without inadvertently erasing points or lines to be left unerased.

In the foregoing, the process to be executed when the erasure mode is selected has been described with reference to the flow chart shown in FIG. 4. The invention is not limited only to the erasure mode, but can provide an easy-to-use information processing apparatus by using a method of changing the area size with the pen motion speed, the method being different for each of various other modes selected.

Figure 5:
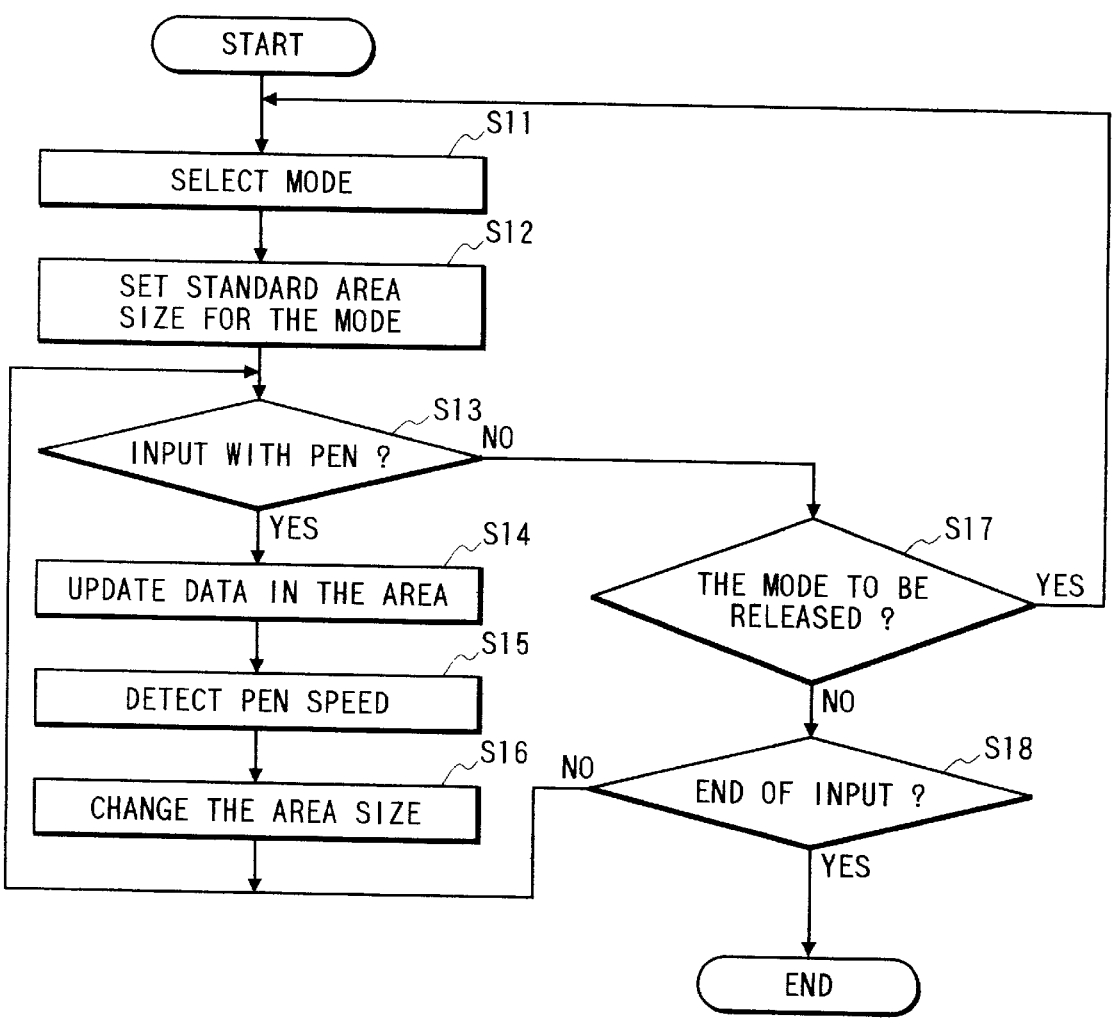
FIG. 5 is a flow chart illustrating a process of setting an area size suitable for a selected mode.

This process will be described with reference to the flow chart shown in FIG. 5. The control program for the flow chart shown in FIG. 5 is being stored in the memory 6, and the process is executed by CPU 5 in accordance with this program.

It is first judged which mode is selected by a user with the pen 1b among menu commands or icons (Step S11). The selected mode includes an erasure mode, a drawing mode, and the like. The selected mode information is stored in the memory 6.

Next, CPU 5 sets a standard area size corresponding to the mode selected at Step S11 and stores its information in the memory 6 (Step S12). This standard memory size is stored in advance in the memory 6 with default values of respective modes (erasure mode, drawing mode, and etc.) selectable at Step S11. The value stored in the memory 6 may be updated to the size selected at the time when the mode was terminated previously.

CPU 5 judges whether there is any input by the user with the pen 1b to the input plate 1a (Step S13). If it is judged that there is no input, it is then judged whether the mode selected at Step S11 was released (Step S17). If released, the flow returns to Step S11 and the process at the next mode continues. If not released and it is not an end of input (Step S18), it is judged as an input wait state at the mode selected at Step S11, and the flow returns to Step S13.

If there is an input with the pen 1b (Step S13), image information in the area defined by the position judged at Step S13 and the area size stored in the memory 6 is updated (Step S14). The process of updating the information at Step S14 differs depending upon the mode selected at Step S11. If the erasure mode is selected, a process of erasing image information in the area is executed, and if a drawing mode is selected, a process of drawing image information on the area is executed. The process of drawing image information is not limited only to a process of painting the whole area with black pixels, but is executed in accordance with the type (hatching type, color, and etc.) of image information to be drawn and a drawing method (overwriting, transparency, and etc), respectively selected at that time.

A motion speed of the pen 1b is detected from position information of the input point at Step S13 and next input point (Step S15). In accordance with this motion speed, the area size of the input point, e.g., a radius of a circle, a length of a side of a square, or the like, is changed and set (Step S16) to update the size data stored in the memory 6, and a process of updating image information at the next input point (Step S13) is executed relative to this size-changed area (Step S14). The changing process at Step S16 follows a rule pre-stored in the memory 6, and the area size is changed in a manner suitable for each mode. For example, in the erasure mode, the area size is made larger as the pen motion speed becomes fast, and in the drawing mode, the area size is made smaller as the pen motion speed becomes fast. The area size may be determined by referring to a table containing correspondence between speeds and sizes and stored in the memory 6.

The invention is not limited only to the above embodiment, but various modifications are possible.

For example, the coordinate pointer is not limited to a pen type pointer, but it may be a mouse type pointer.

The coordinate input system is not limited to the resistor film system, but it may be any one of an electromagnetic induction system, an ultrasonic wave using system, an electrostatic capacitance coupling system, an electromagnetic induction system, and the like. An input plate for the electrostatic capacitance coupling system and electromagnetic induction system is constituted by one or two or more glass or resin plates each having line or loop coil transparent electrode patterns in X- and Y-directions. An input plate for the ultrasonic wave using system which detects the coordinates of a pen position from vibration propagating in the input plate is merely a glass or resin plate.

Although a motion speed of a coordinate pointer is used for setting an erasure area, the size of the erasure area may be changed in accordance with a detected distance between two consecutive input points.

The erasure area may be set for each line segment between two consecutive points instead of each input point. In this case, the erasure area may be set as a square defined by two line segments spaced apart from, and having the same length as, the line segment between two consecutive points. Obviously, the erasure area may also be set by other methods, such as using a quadratic curve defined by three points. In such a case, the erasure area size can be easily changed, for example, by changing the motion distance.

The invention is applicable to various sizes of information processing apparatuses, ranging from a small portable size allowing a user to carry the apparatus in a suitcase or the like to a large size of a so-called electronic blackboard size.

Various modifications of the embodiment are possible so that an information processing apparatus having more easy-to-use man-machine interface can be realized.

What is claimed is:

1. An information processing method comprising the steps of:

selecting an erasure mode;

setting an erasure area of a predetermined standard size in response to said selecting step selecting the erasure mode;

inputting a coordinate of a coordinate pointer linking with the erasure area on a screen;

detecting a motion speed of the coordinate pointer in accordance with the inputted coordinate;

determining whether the detected motion speed is faster or slower than a predetermined motion speed;

changing the size of the erasure area to a size other than the predetermined standard size if the detected motion speed is different than the predetermined motion speed; and erasing a displayed information within the erasure area of the standard size or the changed size, wherein if the detected motion speed is faster than the predetermined motion speed, the erasure area is made larger than the predetermined erasure area, or if the detected motion speed is slower than the predetermined motion speed, the erasure area is made smaller than the predetermined erasure area.

2. An information processing method according to claim 1, wherein the predetermined standard size of the erasure area is changed with a motion distance of the coordinate pointer.

3. An information processing method according to claim 1, wherein the predetermined standard size of the erasure area is changed with a motion speed of the coordinate pointer.

4. An information processing method according to claim 1, wherein the coordinate pointer is a tablet.

5. An image processing method comprising the steps of:

displaying an image stored in a memory on a screen;

inputting position information by pointing on the screen;

detecting a speed on the basis of a motion of the inputted position information;

defining a prescribed area on the screen on the basis of a size corresponding to the detected speed and the inputted position information; and executing a process on the image within the defined area.

6. An information processing method according to claim 5, wherein the size of the image area is changed larger for a desired motion amount when a first mode is selected, and smaller for the desired motion amount when a second mode is selected.

7. An information processing apparatus comprising:

selecting means for selecting an erasure mode;

setting means for setting an erasure area of a predetermined standard size in response to said selecting means selecting the erasure mode;

input means for inputting a coordinate of a coordinate pointer linking with the erasure area on a screen;

detection means for detecting a motion speed of the coordinate pointer in accordance with the inputted coordinate;

determining means for determining whether the detected motion speed is faster or slower than a predetermined motion speed;

changing means for changing the size of the erasure area to a size other than the predetermined standard size if the detected motion speed is different than the predetermined motion speed; and erasing means for erasing a displayed information within the erasure area of the standard size or the changed size, wherein if the detected motion speed is faster than the predetermined motion speed, the erasure area is made larger than the predetermined erasure area, or if the detected motion speed is slower than the predetermined motion speed, the erasure area is made smaller than the predetermined erasure area.

8. An information processing apparatus according to claim 7, wherein the control means changes the predetermined standard size of the erasure area in accordance with a motion distance of the coordinate pointer.

9. An information processing apparatus according to claim 7, wherein the control means changes the predetermined standard size of the erasure area in accordance with a motion speed of the coordinate pointer.

10. An information processing apparatus according to claim 7, wherein the coordinate pointer is a tablet.

11. An image processing apparatus comprising:

display means for displaying an image stored in a memory on a screen;

input means for inputting position information pointed on the screen;

detection means for detecting a speed on the basis of a motion of the inputted position information;

definition means for defining a prescribed area on the screen on the basis of a size corresponding to the detected speed and the inputted position information; and execution means for executing a process on the image within the defined area.

12. An information processing apparatus according to claim 11, wherein the execution means changes a size of the image area larger for a desired motion amount when a first mode is selected, and smaller for the desired motion amount when a second mode is selected.

13. A memory medium storing computer-executable processing steps, the process steps comprising:

a selecting step for selecting an erasure mode;

a setting step for setting an erasure area of a predetermined standard size in response to said selecting step selecting the erasure mode;

an input step for inputting a coordinate of a coordinate pointer linking with the erasure area on a screen;

a detection step for detecting a motion speed of the coordinate pointer in accordance with the inputted coordinate;

a determining step for determining whether the detected motion speed is faster or slower than a predetermined motion speed;

a changing step for changing the size of the erasure area to a size other than the predetermined standard size if the detected motion speed is different than the predetermined motion speed; and an erasing step for erasing a displayed information within the erasure area of the standard size or the changed size, wherein if the detected motion speed is faster than the predetermined motion speed, the erasure area is made larger than the predetermined erasure area, or if the detected motion speed is slower than the predetermined motion speed, the erasure area is made smaller than the predetermined erasure area.

14. A memory medium storing computer-executable process steps, the process steps comprising:

a display step for displaying an image stored in a memory on a screen;

an input step for inputting position information pointed on the screen;

a detecting step for detecting a speed on the basis of a motion of the inputted position information;

a defining step for defining a prescribed area on the screen on the basis of a size corresponding to the detected speed and the inputted position information; and an executing step for executing a process on the image within the defined area.

* * * * *

UNITED STATES PATENT AND TRADEMARK OFFICE
CERTIFICATE OF CORRECTION

PATENT NO. : 6,239,792 B1
DATED : May 29, 2001
INVENTOR(S) : Ryozo Yanagisawa et al.

It is certified that error appears in the above-identified patent and that said Letters Patent is hereby corrected as shown below:

Title page,
Item [56], References Cited, FOREIGN PATENT DOCUMENTS,
" 341572  should read -- 3-41572
 3171321"                3-171321 --.

Column 3,
Line 4, "cross sectional" should read -- cross-sectional --;
Line 20, "cross sectional" should read -- cross-sectional --;
Line 24, "pointing" should read -- pointing to --.

Column 4,
Line 44, "confuse" should read -- become confused --;
Line 52, "pointing" should read -- pointing to --.

Column 5,
Line 4, "maintained" should read -- maintained and --.

Column 7,
Line 53, "changed" should read -- made --.

Column 8,
Line 41, "changes" should read -- makes --.

Signed and Sealed this

Fourth Day of March, 2003

Attest:

JAMES E. ROGAN
Attesting Officer   Director of the United States Patent and Trademark Office